US012625810B2

(12) United States Patent
Li et al.

(10) Patent No.: US 12,625,810 B2
(45) Date of Patent: May 12, 2026

(54) DELAYED CACHE ENTRY INVALIDATION UPDATE FOR POTENTIAL OVERWRITE RE-USE

(71) Applicant: Apple Inc., Cupertino, CA (US)

(72) Inventors: David K. Li, Austin, TX (US); Yoong Chert Foo, London (GB); Benjiman L. Goodman, Austin, TX (US); Chance C. Coats, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/911,588

(22) Filed: Oct. 10, 2024

(65) Prior Publication Data

US 2026/0086944 A1     Mar. 26, 2026

Related U.S. Application Data

(60) Provisional application No. 63/696,970, filed on Sep. 20, 2024.

(51) Int. Cl.
| | |
|---|---|
| *G06F 12/0811* | (2016.01) |
| *G06F 9/38* | (2018.01) |
| *G06F 12/0808* | (2016.01) |
| *G06F 12/0815* | (2016.01) |

(52) U.S. Cl.
CPC ........ *G06F 12/0811* (2013.01); *G06F 9/3887* (2013.01); *G06F 12/0808* (2013.01); *G06F 12/0815* (2013.01)

(58) Field of Classification Search
None
See application file for complete search history.

(56) References Cited

U.S. PATENT DOCUMENTS

| | | | | |
|---|---|---|---|---|
| 10,698,822 | B1 * | 6/2020 | Yau | ..................... G06F 12/0808 |
| 11,487,671 | B2 | 11/2022 | Zhang et al. | |
| 11,940,930 | B2 | 3/2024 | Bhoria et al. | |
| 11,977,486 | B2 | 5/2024 | ElSharif et al. | |

(Continued)

FOREIGN PATENT DOCUMENTS

| | | |
|---|---|---|
| CN | 110443360 B | 8/2021 |
| CN | 113986774 A | 1/2022 |

(Continued)

*Primary Examiner* — Kaushikkumar M Patel

(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to cache control in cache hierarchies. In some embodiments, processor execution circuitry is configured to perform operations on input operand data from a first-level cache, including a first operation that reads first data from an entry in the first-level cache and signals an invalidation of the first data. Control circuitry may set an indicator, in response to the first operation, to indicate that the entry in the first-level cache has a pending invalidation (e.g., a last-use indicator). The control circuitry may, in response to a second operation overwriting the entry in the first-level cache while the indicator is set, clear the indicator without invalidating a corresponding entry in a second-level cache. This may advantageously reduce invalidate operations and bandwidth to the second-level cache.

19 Claims, 9 Drawing Sheets

(56) References Cited

U.S. PATENT DOCUMENTS

| | | | |
|---|---|---|---|
| 2008/0109606 A1* | 5/2008 | Lataille | G06F 12/12 |
| | | | 711/E12.051 |
| 2013/0086363 A1* | 4/2013 | Gschwind | G06F 9/30076 |
| | | | 712/E9.016 |
| 2014/0101390 A1* | 4/2014 | Sohi | G06F 12/0815 |
| | | | 711/144 |
| 2017/0075810 A1* | 3/2017 | Havlir | G06F 12/0848 |
| 2020/0034472 A1* | 1/2020 | Cai | G06F 11/3006 |
| 2021/0303479 A1* | 9/2021 | Riocreux | G06F 9/467 |
| 2022/0083472 A1* | 3/2022 | Vash | G06F 12/0815 |
| 2022/0197797 A1 | 6/2022 | Mandal et al. | |
| 2022/0197798 A1 | 6/2022 | Mandal et al. | |
| 2022/0224776 A1 | 7/2022 | Doshi et al. | |
| 2024/0111674 A1 | 4/2024 | Garg et al. | |

FOREIGN PATENT DOCUMENTS

| | | |
|---|---|---|
| CN | 115357526 A | 11/2022 |
| KR | 2570030 B1 | 8/2023 |

\* cited by examiner

Vertex Data

Processing Flow 100

Graphics Unit 150

*Example compiler procedure*

Detect last use of read operand
410

Set last-use indication for that operand in compiled instruction
420

Subsequent instruction available that could target operand location?
430

No

Yes

Select detected instruction and use operand location as destination operand
440

Compile subsequent instruction(s) according to default technique
450

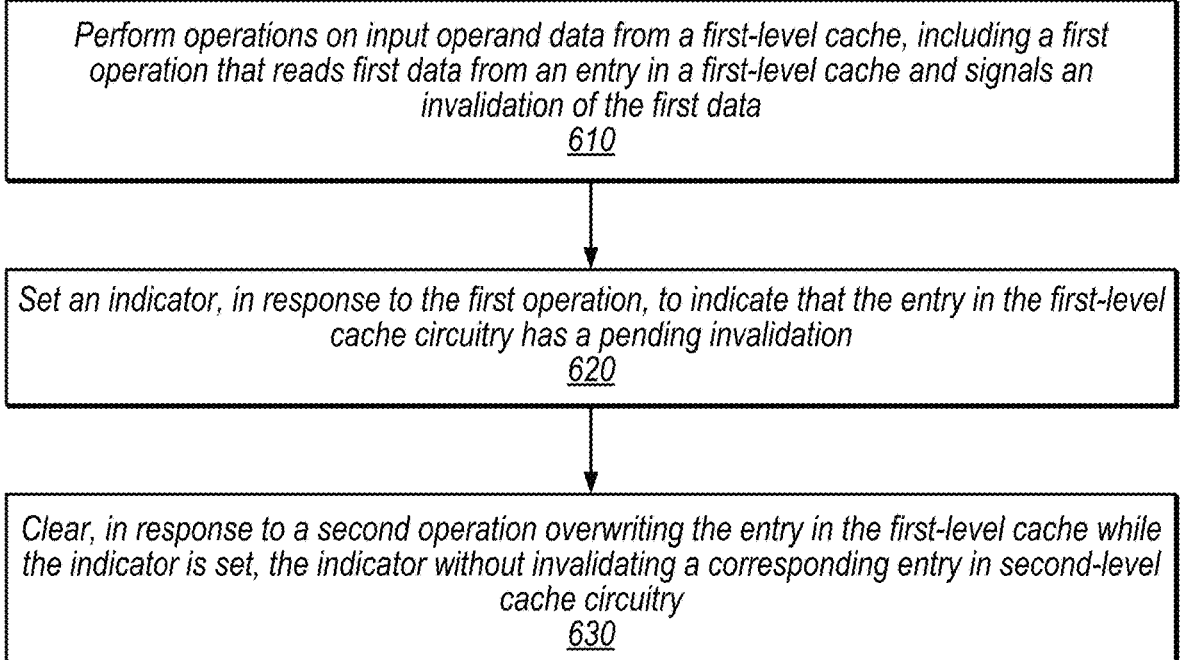

*Perform operations on input operand data from a first-level cache, including a first operation that reads first data from an entry in a first-level cache and signals an invalidation of the first data*
*610*

*Set an indicator, in response to the first operation, to indicate that the entry in the first-level cache circuitry has a pending invalidation*
*620*

*Clear, in response to a second operation overwriting the entry in the first-level cache while the indicator is set, the indicator without invalidating a corresponding entry in second-level cache circuitry*
*630*

*FIG. 6*

DELAYED CACHE ENTRY INVALIDATION UPDATE FOR POTENTIAL OVERWRITE RE-USE

The present application claims priority to U.S. Provisional App. No. 63/696,970, entitled "Delayed Cache Entry Invalidation Update for Potential Overwrite Re-use," filed Sep. 20, 2024, the disclosure of which is incorporated by reference herein in its entirety.

BACKGROUND

Technical Field

This disclosure relates generally to computer processors and more particularly to cache invalidation control.

Description of Related Art

Computer processors often utilize multiple levels of data caches to store data that is likely to be accessed again (reducing latency relative to retrieving the data from memory, for example). In this context, a processor may perform various cache control operations, e.g., to evict data from one cache to another cache or invalidate data in one or more caches. Cache maintenance and control operations may utilize bandwidth to a given cache level. Therefore, it may generally be desirable to reduce cache control operations.

BRIEF DESCRIPTION OF DRAWINGS

FIG. 6 is a flow diagram illustrating an example method, according to some embodiments.

DETAILED DESCRIPTION

Figure 1A:
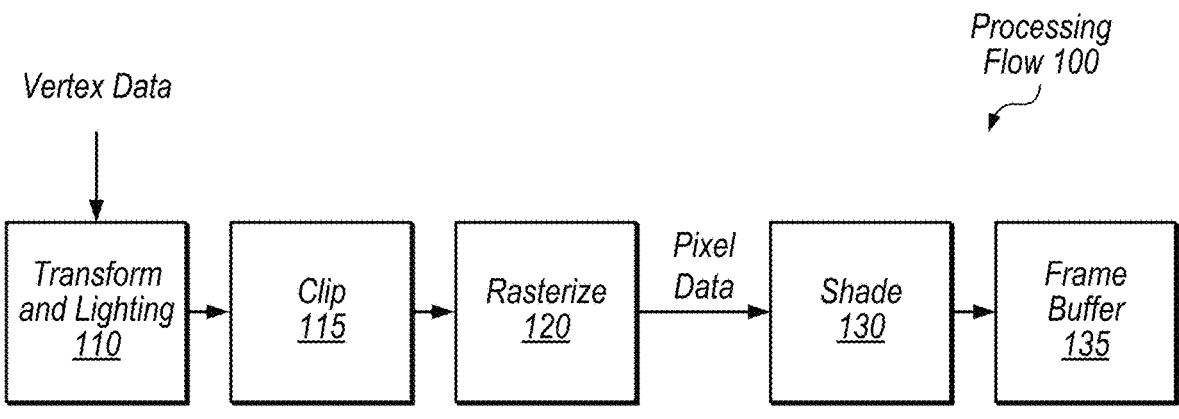
FIG. 1A is a diagram illustrating an overview of example graphics processing operations, according to some embodiments.

Disclosed techniques allow delayed cache entry invalidation in certain scenarios, which may allow a compiler to potentially re-use the entry and avoid invalidation signaling to one or more cache levels. This may advantageously improve bandwidth for those cache levels, which may ultimately improve processor performance, reduce power consumption, or both.

Some processors may implement last-use signaling, e.g., where the compiler provides a last-use indication for one or more input operands of an instruction. When it is the last use of an operand, that operand does not need to be cached after the operation is complete (and indeed, the data should no longer be considered valid). As one specific example, a read operand cache in a graphics processor may store register data very close to the execution circuitry (e.g., closer to the execution circuitry than a register file or level 0 data cache). When the compiler signals the last use of a register, that register can be re-used for other data and the operand data need not be cached. This is one example of a more general concept that a read of data may have an attached invalidation of the data.

Traditional implementations might treat this invalidation as a hazard and might immediately perform an invalidation operation to one or more cache levels further from the execution circuitry (e.g., for a last use of data in the operand cache, control circuitry might send an invalidation to the data cache at the next level in a cache hierarchy).

In contrast, in disclosed embodiments, cache control circuitry may mark operand data as having a pending invalidation, which may be cleared if the corresponding location (e.g., register) is re-used. In this scenario, control circuitry may not send an invalidate command to other cache levels at all (even though an invalidate was attached to the read data), which may reduce bandwidth to the other cache level(s). These advantages may be particularly relevant in the context of single-instruction multiple-thread (SIMT) implementations in which data for multiple threads of a SIMT group may be cached together in a given cache entry.

In some embodiments, a compiler may attempt to re-use operand locations for instructions after operations that signal an invalidation of their read data, which may increase opportunities to suppress cache invalidation signaling. The processor may guarantee invalidation suppression if the compiler does so within certain parameters. Also note that while register reads are discussed in various detailed examples for purposes of illustration, similar techniques may be used for other types of operand data (e.g., for traditional load operations) or for data from other types of data caches than operand caches.

Cache control circuitry may also take the invalidate-pending status into account when selecting victim entries for eviction. Further, an extra eviction port may be dedicated for evictions for entries with invalidate-pending status.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
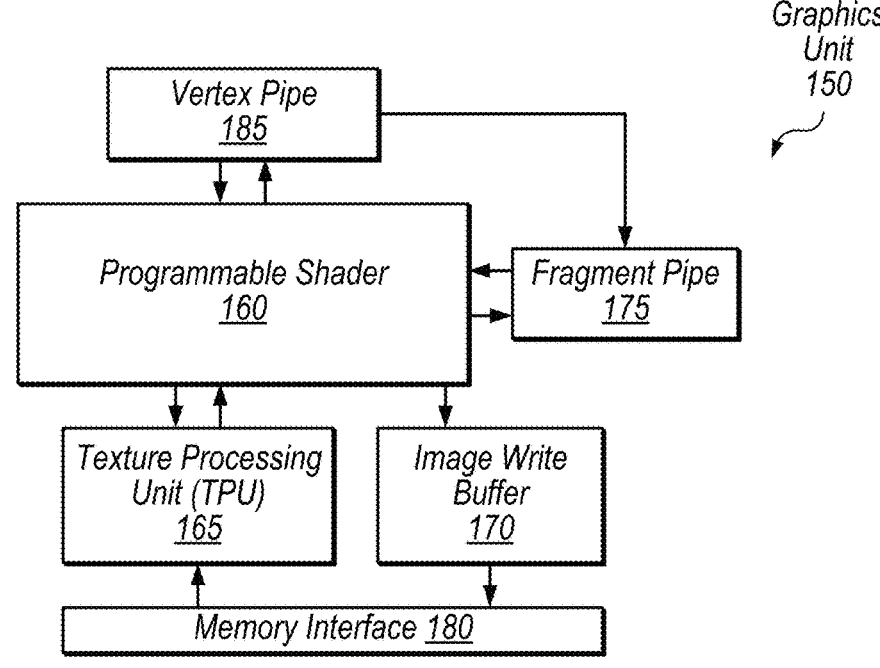
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Invalidate-Pending Cache State

Figure 2:
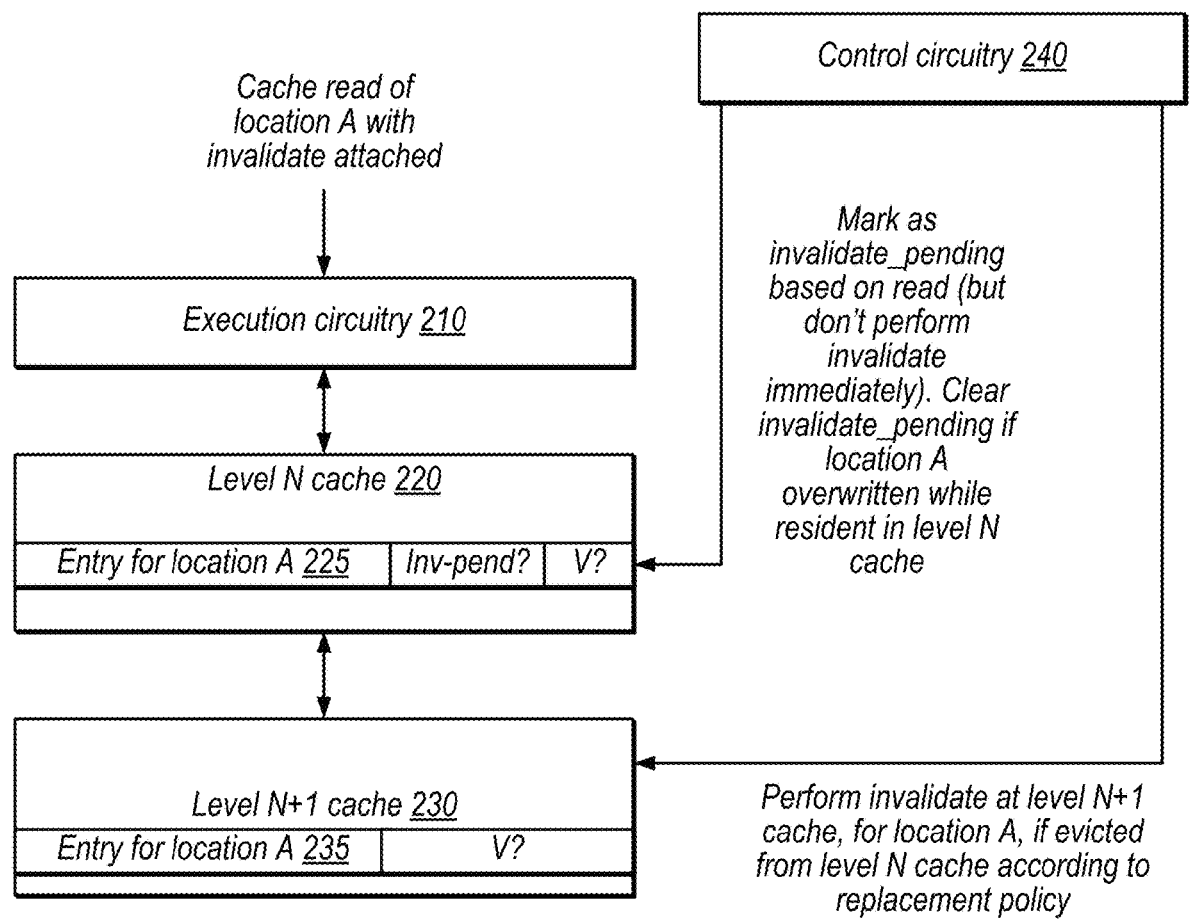
FIG. 2 is a block diagram illustrating example cache circuitry that supports an invalidate-pending status, according to some embodiments.

FIG. 2 is a block diagram illustrating example cache circuitry that supports an invalidate-pending status, according to some embodiments. In the illustrated example, a computing system includes execution circuitry 210, level N cache 220, level N+1 cache 230, and control circuitry 240. As discussed in detail below, control circuitry 240 utilizes the invalidate-pending field of a given entry in cache 220 to suppress invalidation signaling to cache 230, in some embodiments.

Execution circuitry 210, in the illustrated example, is configured to perform various operations to execute instructions. For example, execution circuitry 210 may include various pipeline stages configured to fetch and decode instructions, perform operations specified by certain instructions (e.g., arithmetic logic unit (ALU) stages, load/store stages, etc.), retrieve input operand data for various instructions, store result data, and so on. Execution circuitry 210 may include SIMT pipelines. In the illustrated example, execution circuitry 210 receives a cache read of location A with an invalidate attached. For example, this may be an operation for an instruction that reads a general-purpose register and has a last-use indication for the register. In response, execution circuitry 210 accesses level N cache 220 to retrieve the data corresponding to location A.

Level N cache circuitry 220, in the illustrated embodiment, is configured to store operand data for use by execution circuitry 210. Level N cache 220 may be closest cache level to execution circuitry 210, e.g., an operand cache. Generally, cache 220 (and various caches discussed herein) may use various known caching techniques, such as being tagged using all or a portion of an address (or some other identification of an operand location), being associative or direct mapped, utilizing control circuitry to detect hits and misses and select victim entries for eviction, etc.

In the illustrated example, entry 225 corresponding to location A has an invalidate-pending field and a valid field. Note that this hardware cache entry may be allocated for location A (e.g., a particular general-purpose register) at the present time, but may be used for other data at other times, according to various cache allocation and replacement policies.

Level N+1 cache 230, in the illustrated embodiment, is at another level in a cache/memory hierarchy relative to level N cache 220. In some embodiments, cache 230 is a write-back cache that is larger than cache 220 (e.g., has a greater number of entries) and is inclusive of data in cache 220. Therefore, modification of cache state in cache 220 may typically influence the state of data in cache 230. For example, invalidation of an entry in cache 220 may typically cause an invalidation of the corresponding entry in cache 230. In the illustrated example scenario, an entry 235 has been allocated in cache 230 for location A (and this entry also has a corresponding valid bit).

Control circuitry 240, in the illustrated embodiment, is configured to mark entry 225 as invalidate-pending based on the read of location A with the invalidate attached. But, in this example, control circuitry 240 does not immediately invalidate the entry (e.g., the valid field of entry 225 may remain valid) or send invalidate signaling to cache 230.

Rather, in this example, if location A is overwritten by a subsequent instruction (e.g., another instruction uses location A as a destination for its result data) control circuitry 240 clears the invalidate-pending field in entry 225 and does not send invalidate signaling to cache 230 for the cache read of location A. The invalidate signaling may not need to be sent because the overwritten entry is now marked as dirty (e.g., using a dirty/modified field that is not explicitly shown) so the corresponding entry in cache 230 will be properly considered to hold stale data. Suppression of the invalidate signaling, in this example, may advantageously reduce bandwidth to cache 230, in some embodiments, while maintaining correctness of cached data.

If, however, entry 225 is evicted from cache 220 according to a replacement policy implemented by control circuitry 240 (e.g., a least-recently-used policy), control circuitry 240 is configured to perform an invalidate of entry 235 for cache 230.

Example Instruction Sequence

Figure 3:
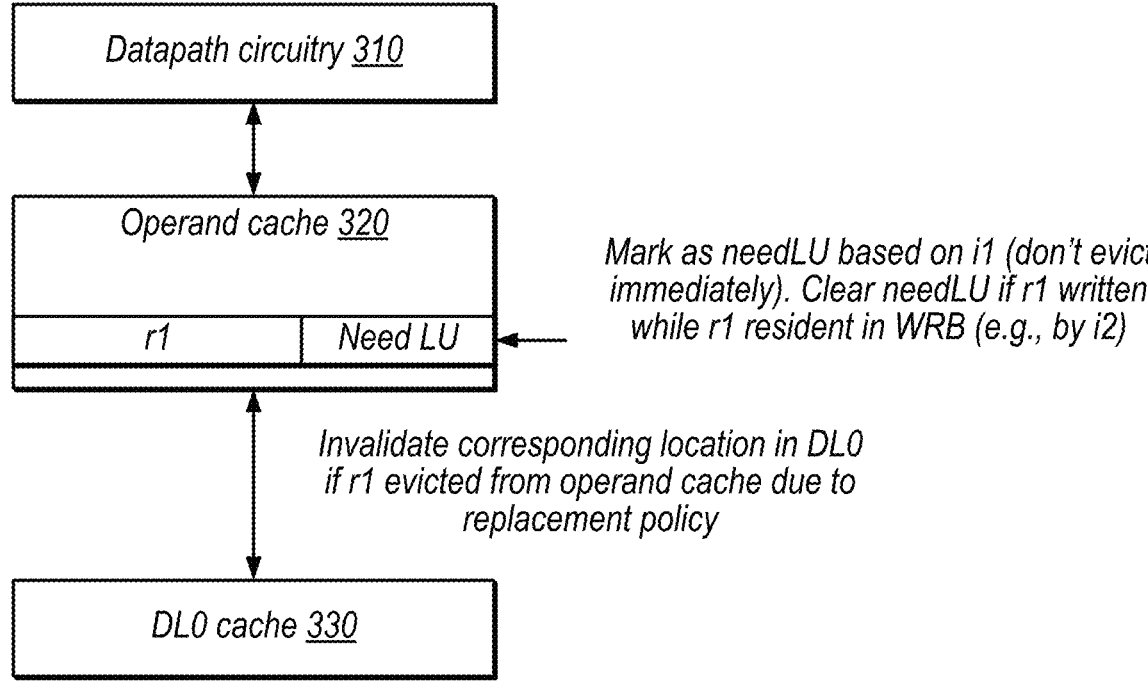
FIG. 3 is a diagram illustrating example cache entry re-use and invalidation suppression in the context of an example instruction sequence, according to some embodiments.

FIG. 3 is a diagram illustrating example re-use and invalidation suppression in the context of an example instruction sequence, according to some embodiments. In the illustrated example, the computing system includes datapath circuitry 310, operand cache 320, and DL0 cache 330. In the illustrated example, the instructions i0, i1, and i2 are add instructions that access various general-purpose registers r0-r6.

In the example instruction sequence, instruction i0 adds operands from registers r5 and r6 and stores the result in register r1. Instruction i1 follows in program order and adds operands from r1 and r2 and stores the result in r0. Note that instruction i1 includes a last use ("lu") indication for input operand r1. This is an invalidation attached to r1 and indicates that the r1 data will not be used again. Instruction i2 follows in program order and adds operands from r3 and r4 and stores the result in r1. Note that this overwrites the value in r1. In embodiments with the invalidate-pending status for the cached r1 data, this overwrite by instruction i2 may allow suppression of the last-use invalidate to cache 330.

Datapath circuitry 310, in some embodiments, is datapath circuitry of programmable shader 160 and is one example of execution circuitry 210. As shown, datapath circuitry 310 is configured to operate on data in operand cache 320, e.g., based on executing the example instruction sequence.

Operand cache 320 is one example of cache 220. In some embodiments, operand cache 320 is an operand cache configured to store register data. In this example, it utilizes an entry to store r1 data generated by instruction i0 for use by instruction i1. In this example, control circuitry also sets the "Need LU" field (one example of an invalidate-pending field) in response to the last use indication for r1 in instruction i1. As shown, however, the r1 entry is not immediately evicted, but rather may be cleared if r1 is overwritten (e.g., in operand cache 320 or a separate operand cache for dirty data, if cache 320 is a read-only operand cache). For example, in the illustrated example instruction i2 overwrites r1 and the invalidate to DL0 cache 330 associated with the last-use indication in instruction i1 is suppressed.

In some embodiments, processor hardware provides a guarantee, for operand data with an attached invalidate, that if the corresponding location is overwritten within N instructions, an invalidate message to a certain cache level is suppressed. For example, a pipeline stage that handles hazards may be configured to provide this guarantee.

In some embodiments, a given entry in operand cache 320 has a pointer to a corresponding entry in DL0 cache 330, a valid field, a channel identifier (e.g., for multiple execution channels that share various execution pipelines), etc. Entries may be tagged using various information (e.g., register identifiers).

DL0 cache 330 is one example of cache 230. As shown, if r1 is evicted from operand cache 320 according to a replacement policy before the NeedLU field is cleared, control circuitry may invalidate a corresponding entry in DL0 cache 330.

Note that in some traditional implementations, instruction i2 might be stalled while waiting for a flush to DL0 cache 330 associated with the last-use from instruction i1 (e.g., this last-use may be handled as a hazard). In disclosed embodiments, such stalls may advantageously be reduced or avoided, in addition to reducing invalidate bandwidth to DL0 cache 330.

Example Compiler Techniques

Figure 4:
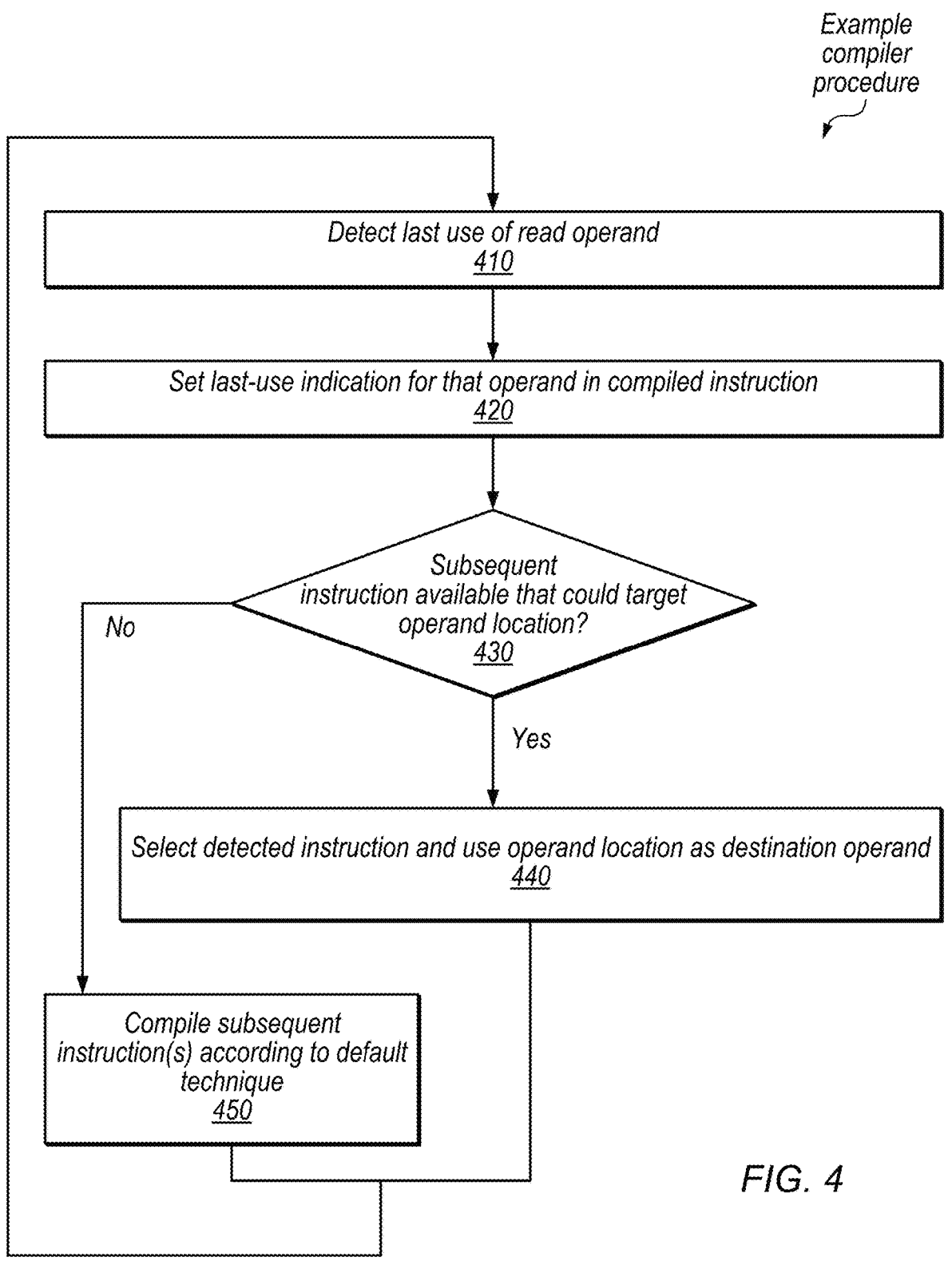
FIG. 4 is a flow diagram illustrating an example compiler method for re-use, according to some embodiments.

FIG. 4 is a flow diagram illustrating an example compiler method for re-use, according to some embodiments. Note that a compiler may be aware that it is strongly advised to overwrite operand locations following a last-use indication for those locations, for certain processor implementations.

At 410, in the illustrated example, the compiler detects last use of a read operand. This may be based on assignment of operands to micro-operations for various decoded program instructions, for example, and knowledge of utilized operands over a window of instructions.

At 420, in the illustrated example, the compiler sets a last-use indication for the operand in the compiled instruction (e.g., the "lu"indication in instruction i1).

At 430, the compiler determines whether there is a subsequent instruction available that could target the operand location. If not, flow proceeds to 450 and the compiler compiles subsequent instructions according to a default technique.

If a candidate instruction is identified at 430, flow proceeds to 440 and the compiler selects the detected instruction and uses the operand location as a destination operand. This may include assigning the destination of a subsequent instruction (e.g., instruction i2) to the operand location. This may include moving micro-operations out of program order if no hazards are detected, for example, to utilize a particular instruction to overwrite the operand location.

Disclosed hardware and compiler techniques may substantially reduce invalidation operations to cache 230 or 330 for read operands with an attached invalidate, particularly when used in combination.

Example Eviction Techniques

Figure 5:
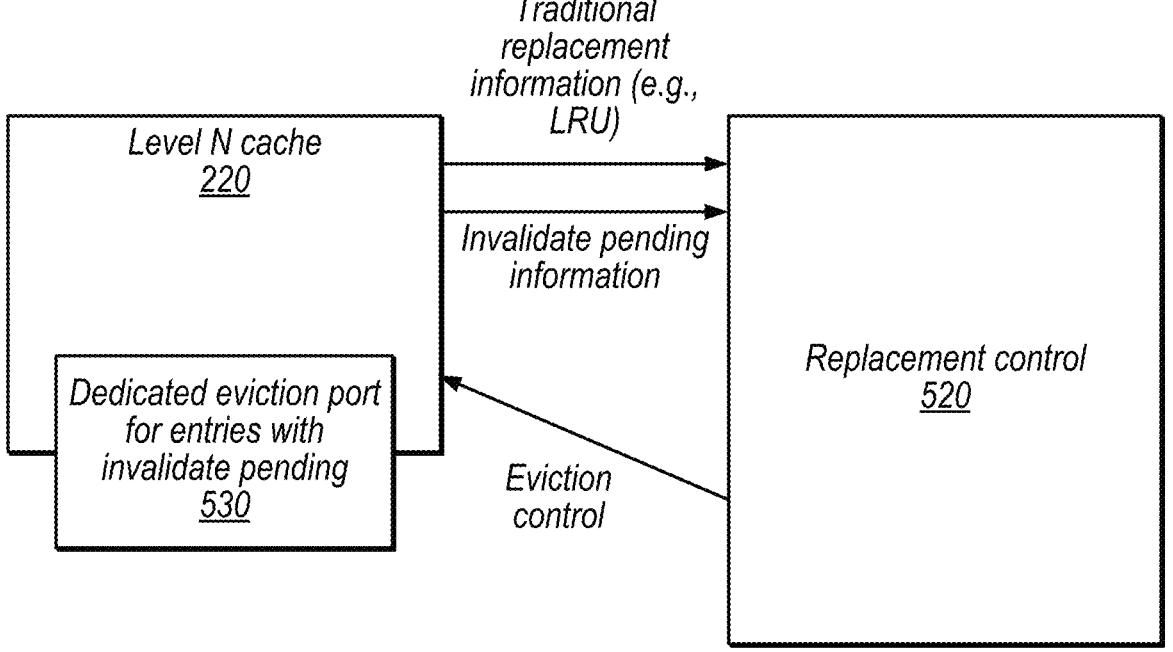
FIG. 5 is a block diagram illustrating example replacement control circuitry that considers invalidate-pending status as an input, according to some embodiments.

FIG. 5 is a block diagram illustrating example replacement control circuitry that considers invalidate-pending status as an input, according to some embodiments. In the illustrated embodiment, a computing system includes replacement control circuitry 520 for level N cache 220.

Replacement control circuitry 520, in some embodiments, is configured to select victim entries in cache 220 for invalidation, e.g., to make room to allocate those entries to cache other data. Replacement control circuitry 520 may implement any of various appropriate algorithms for selecting victim entries, including least-recently-used (LRU) or pseudo-LRU algorithms. Therefore, replacement control 520 operates in part based on traditional input information (e.g., LRU control information for entries).

Invalidate pending information for entries in cache 220, in the illustrated embodiment, is also provided to replacement control 520 as an input to the victim selection control logic that generates eviction control signals to level N cache 220. For example, in some embodiments, replacement control circuitry 520 is configured to prioritize entries with the invalidate-pending field set for eviction, followed by software-indicated flushes (e.g., using an LRU search), followed by remaining entries (e.g., using an LRU search among remaining entries). This may evict entries for which the compiler was not able to overwrite the source location, for example, but this may be rare because those entries may typically be overwritten (and their invalidate-pending status cleared) before being considered by control circuitry 520 for eviction.

In the illustrated example, cache 220 also includes a dedicated eviction port 530 for entries with the invalidate-pending field set. This may allow for parallel eviction of multiple entries (e.g., using port 530 and one or more other read ports of cache 220 in parallel), which may improve eviction bandwidth, particularly in embodiment in which entries with the invalidate-pending field set are prioritized for eviction.

Example Method

FIG. 6 is a flow diagram illustrating an example method, according to some embodiments. The method shown in FIG.

6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a computing system (e.g., execution circuitry 210 or datapath circuitry 310) performs operations on input operand data from a first-level cache, including a first operation that reads first data from an entry in a first-level cache and signals an invalidation of the first data. In some embodiments, the first-level cache is a closest cache level to the processor execution circuitry in a cache hierarchy.

At 620, in the illustrated embodiment, the computing system (e.g., control circuitry 240) sets an indicator, in response to the first operation, to indicate that the entry in the first-level cache has a pending invalidation. In some embodiments, the entry in the first-level cache includes a valid indication (thus, the indicator and the valid indication may be independent).

At 630, in the illustrated embodiment, the computing system (e.g., control circuitry 240) clears, in response to a second operation overwriting the entry in the first-level cache while the indicator is set, the indicator without invalidating a corresponding entry in second-level cache circuitry. Alternatively, in response to eviction of the entry in the first-level cache based on a replacement policy while the indicator is set, the computing system may invalidate the corresponding entry in the second-level cache circuitry.

Note that the invalidate-pending indicator is a single bit, in some embodiments, but may be encoded in a multi-bit field with other information in other embodiments. Generally, "setting" and "clearing" this indicator may be performed by changing the indicator to a pre-determined corresponding value in a given embodiment, but these terms do not imply any specific value (e.g., setting the indicator may correspond to a zero value in some embodiments or a one value in other embodiments).

In some embodiments, the second-level cache circuitry is a write-back cache and is inclusive of locations cached in the first-level cache. In some embodiments, the first-level cache is an operand cache and the second-level cache circuitry is a register file or a register data cache. In some embodiments, the first operation is a register read with a last-use indication that signals the invalidation. In some embodiments, the operand cache includes entries configured to store register data for multiple threads of single-instruction multiple-thread (SIMT) groups of graphics programs executed by the processor execution circuitry.

In some embodiments, the control circuitry is configured to guarantee suppression of an invalidate operation to the second-level cache circuitry for the first operation if an immediately-subsequent operation to the first operation overwrites the entry in the first-level cache.

In some embodiments the first operation is a load operation that specifies a memory address. Generally, disclosed techniques may be used for register operands, for other types of operands, or both.

In some embodiments, the processor execution circuitry executes a program that was compiled to re-use operand locations for instructions subsequent to operations that signal an invalidation of their read data. A non-transitory computer-readable medium may store instructions of a compiler configured to the re-use operand locations for instructions subsequent to operations that signal an invalidation of their read data, as described herein.

In some embodiments, replacement circuitry is configured to prioritize entries in the first-level cache indicated as having a pending invalidation for eviction. In some embodiments, eviction port circuitry is configured to handle evictions only for entries in the first-level cache indicated as having a pending invalidation.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, Attorney memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Device

Figure 7:
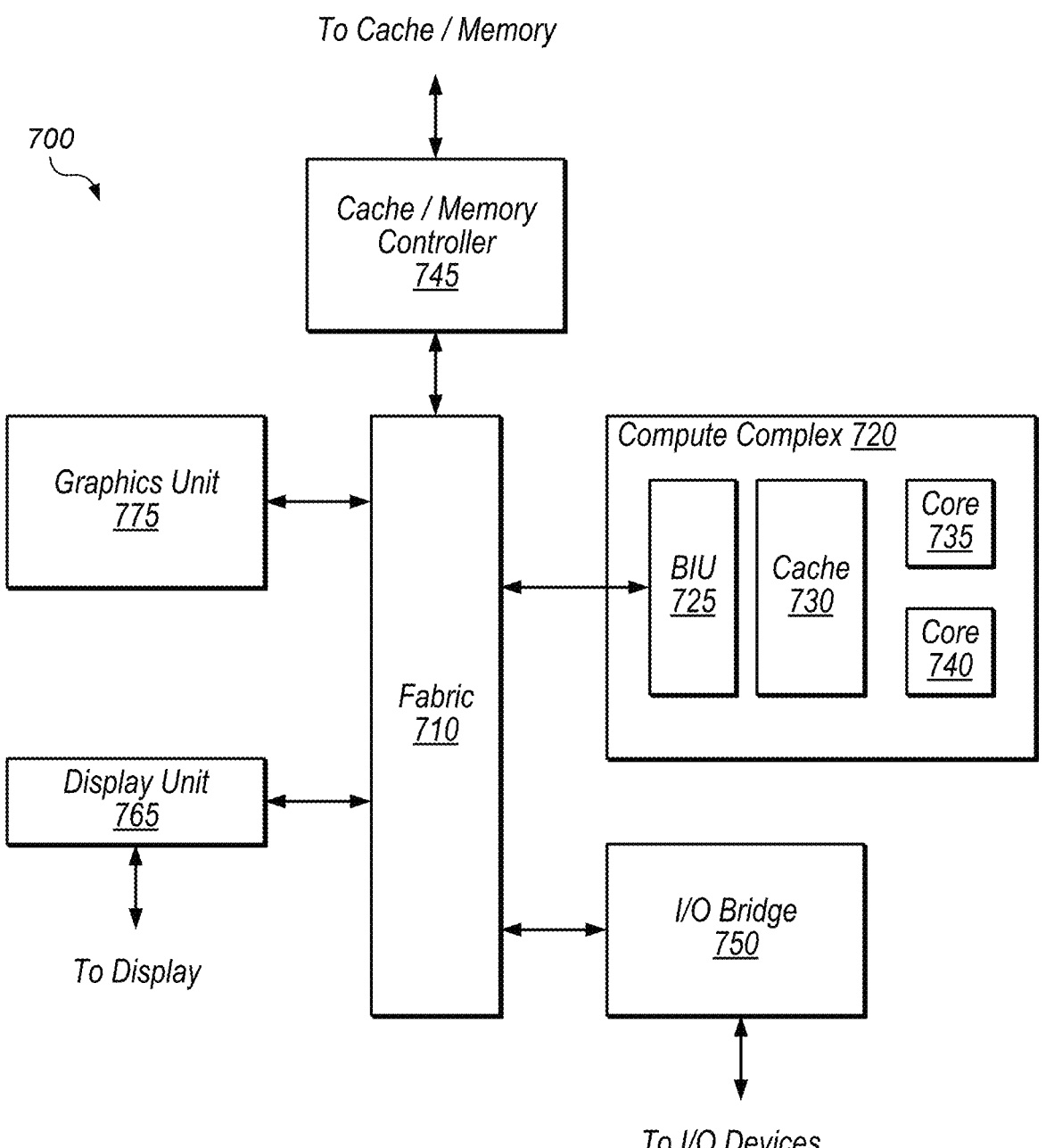
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions. These instructions may be stored in computer readable medium such as a memory coupled to memory controller 745 discussed below.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches. Memory coupled to controller 745 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 745 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

Graphics unit 775 may include one or more processors, e.g., one or more graphics processing units (GPUs). Graphics unit 775 may receive graphics-oriented instructions, such as OPENGL®, Metal®, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 775 may implement disclosed invalidate-pending techniques, e.g., in one or more operand caches or other data caches.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Example Applications

Figure 8:
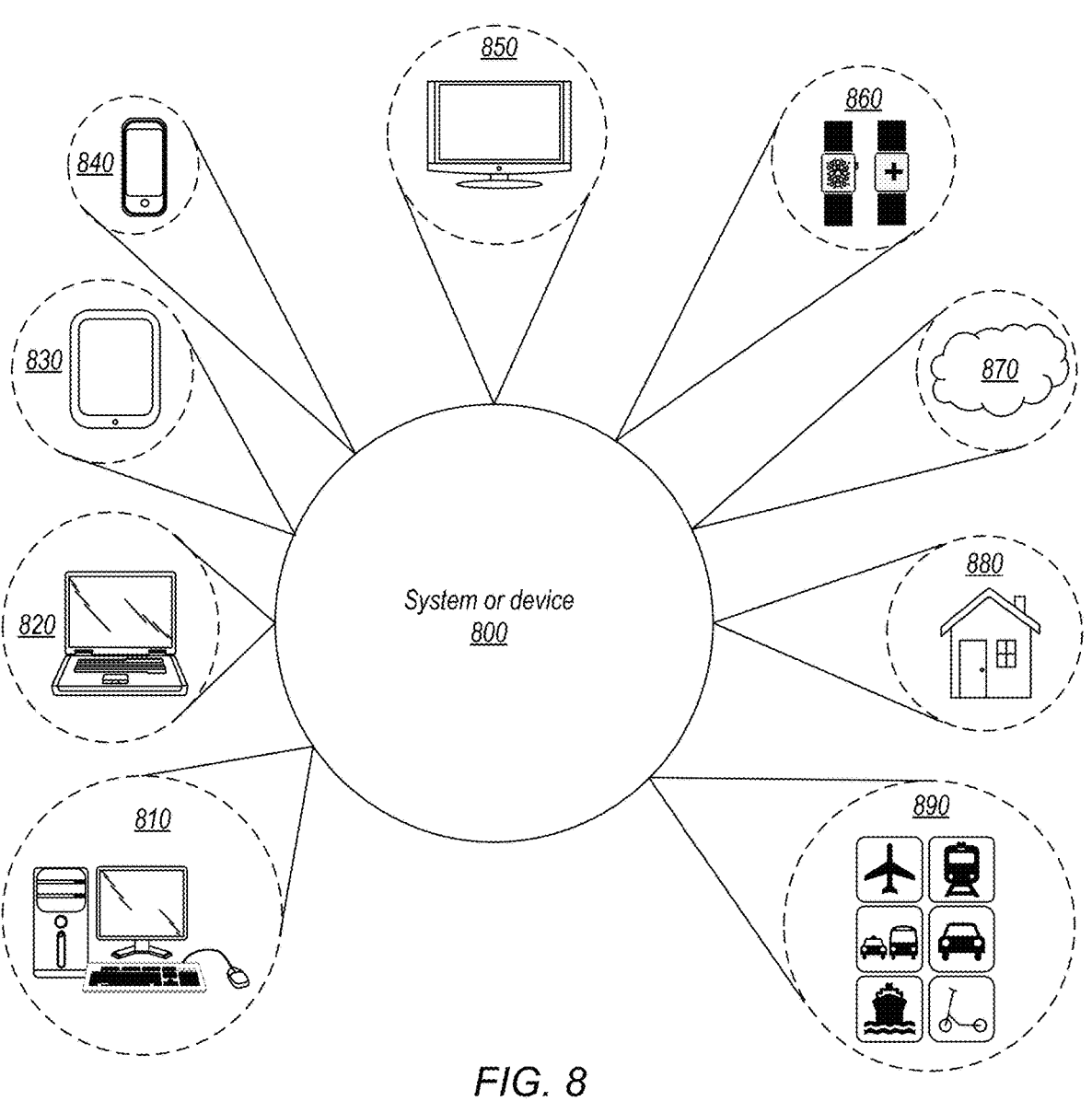
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 9:
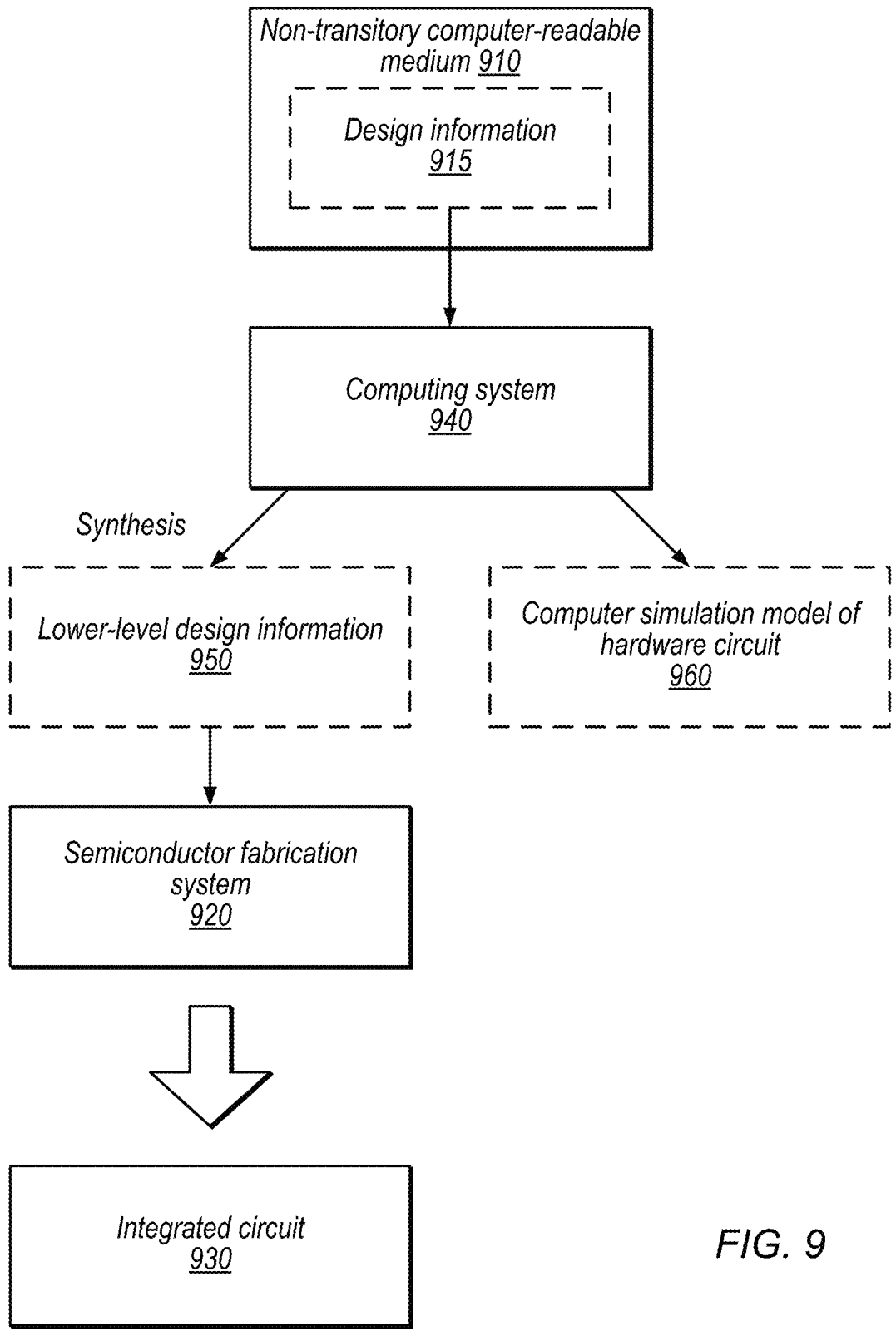
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 910 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Accordingly, non-transitory computer-readable storage medium 910 may include two or more memory media; such media may reside in different locations-for example, in different computer systems that are connected over a network.

Design information 915 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in FIGS. 1B, 2-3, 5, and 7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to." does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality"of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or"is being used in the exclusive sense.

A recitation of "w, x, y, or z, or any combination thereof" or "at least one of. . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of. W, X, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for"[performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
first-level cache circuitry;
second-level cache circuitry, wherein the first-level cache circuitry and second-level cache circuitry are at different levels in a cache hierarchy;
processor execution circuitry configured to perform operations on input operand data from the first-level cache circuitry, including a first operation that reads first data from an entry in the first-level cache circuitry and signals an invalidation of the first data; and
control circuitry configured to:
set an indicator, in response to the first operation, to indicate that the entry in the first-level cache circuitry has a pending invalidation;
in response to a second operation overwriting the entry in the first-level cache circuitry while the indicator is set, clear the indicator without invalidating a corresponding entry in the second-level cache circuitry; and
in response to eviction of the entry in the first-level cache circuitry based on a replacement policy while the indicator is set, invalidate the corresponding entry in the second-level cache circuitry.

2. The apparatus of claim 1, wherein:
the first-level cache circuitry is an operand cache;
the second-level cache circuitry is a register file or a register data cache; and
the first operation is a register read with a last-use indication that signals the invalidation.

3. The apparatus of claim 2, wherein the operand cache includes entries configured to store register data for multiple threads of single-instruction multiple-thread (SIMT) groups of graphics programs executed by the processor execution circuitry.

4. The apparatus of claim 1, wherein the control circuitry is configured to guarantee suppression of an invalidate operation to the second-level cache circuitry for the first operation if an immediately-subsequent operation to the first operation overwrites the entry in the first-level cache circuitry.

5. The apparatus of claim 4, wherein the processor execution circuitry executes a program that was compiled to re-use operand locations for instructions subsequent to operations that signal an invalidation of their read data.

6. The apparatus of claim 1, wherein the first-level cache circuitry is a closest cache level to the processor execution circuitry in the cache hierarchy.

7. The apparatus of claim 1, wherein the first operation is a load operation that specifies a memory address.

8. The apparatus of claim 1, wherein the entry in the first-level cache circuitry includes a valid indication.

9. The apparatus of claim 1, further comprising:
replacement control circuitry configured to prioritize entries in the first-level cache circuitry indicated as having a pending invalidation for eviction.

10. The apparatus of claim 1, wherein the second-level cache circuitry is a write-back cache and is inclusive of data from locations cached in the first-level cache circuitry.

11. The apparatus of claim 1, further comprising:
eviction port circuitry configured to handle evictions only for entries in the first-level cache circuitry indicated as having a pending invalidation.

12. A method, comprising:
performing, by a computing system, operations on input operand data from a first-level cache, including a first operation that reads first data from an entry in the first-level cache and signals an invalidation of the first data;
setting, by the computing system, an indicator, in response to the first operation, to indicate that the entry in the first-level cache has a pending invalidation; and
clearing, by the computing system in response to a second operation overwriting the entry in the first-level cache while the indicator is set, the indicator without invalidating a corresponding entry in a second-level cache, wherein the second-level cache is a write-back cache and is inclusive of data from locations cached in the first-level cache.

13. The method of claim 12, wherein:
the first-level cache is an operand cache;
the second-level cache is a register file or a register data cache; and
the first operation is a register read with a last-use indication that signals the invalidation.

14. The method of claim 12, wherein:
the computing system guarantees suppression of an invalidate operation to the second-level cache for the first operation if an immediately-subsequent operation to the first operation overwrites the entry in the first-level cache.

15. The method of claim 14, further comprising:

compiling a program that includes the first operation, including selecting a destination for the immediately-subsequent operation to overwrite the entry in the first-level cache.

16. The method of claim 12, wherein the first operation is a load operation that specifies a memory address.

17. The method of claim 12, further comprising:

prioritizing, by the computing system, entries in the first-level cache indicated as having a pending invalidation for eviction.

18. The method of claim 12, wherein the second-level cache is a write-back cache and is inclusive of data from locations cached in the first-level cache.

19. A non-transitory computer-readable medium having instructions stored thereon that are executable by a computing device to perform operations comprising:

compiling a program for execution by a processor that includes a first-level cache and a second-level cache, including:

generating a first operation that reads first data and signals an invalidation of the first data; and generating a second operation, subsequent to the first operation in program order, including selecting a destination for the second operation to overwrite the first data;

wherein the processor includes control circuitry configured to:

read the first data from an entry in the first-level cache for the first operation;

set an indicator, in response to the first operation, to indicate that the entry in the first-level cache has a pending invalidation; and in response to the second operation overwriting the entry in the first-level cache while the indicator is set, clear the indicator without invalidating a corresponding entry in the second-level cache.

* * * * *